United States Patent
Wang et al.

(10) Patent No.: US 11,323,711 B2
(45) Date of Patent: May 3, 2022

(54) METHOD AND SYSTEM FOR SIGNALING CHROMA QUANTIZATION PARAMETER OFFSET

(71) Applicant: ALIBABA GROUP HOLDING LIMITED, Grand Cayman (KY)

(72) Inventors: Zhao Wang, Beijing (CN); Yan Ye, San Mateo, CA (US); Jiancong Luo, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/985,826

(22) Filed: Aug. 5, 2020

(65) Prior Publication Data

US 2021/0092380 A1 Mar. 25, 2021

Related U.S. Application Data

(60) Provisional application No. 62/903,192, filed on Sep. 20, 2019.

(51) Int. Cl.

| | |
|---|---|
| *H04N 19/124* | (2014.01) |
| *H04N 19/70* | (2014.01) |
| *H04N 19/157* | (2014.01) |
| *H04N 19/174* | (2014.01) |
| *H04N 19/186* | (2014.01) |

(52) U.S. Cl.
CPC ......... *H04N 19/124* (2014.11); *H04N 19/157* (2014.11); *H04N 19/174* (2014.11); *H04N 19/186* (2014.11); *H04N 19/70* (2014.11)

(58) Field of Classification Search
None
See application file for complete search history.

(56) References Cited

U.S. PATENT DOCUMENTS

| | | | | |
|---|---|---|---|---|
| 10,277,910 | B2 * | 4/2019 | Xiu | H04N 19/86 |
| 10,425,659 | B2 * | 9/2019 | Zou | H03M 7/40 |
| 10,484,686 | B2 * | 11/2019 | Xiu | H04N 19/182 |
| 10,939,096 | B2 * | 3/2021 | Xiu | H04N 19/593 |
| 11,039,143 | B2 * | 6/2021 | Zhang | H04N 19/13 |
| 2014/0098883 | A1 | 4/2014 | Hannuksela et al. | |

(Continued)

FOREIGN PATENT DOCUMENTS

WO WO 2021/055114 A1 3/2021

OTHER PUBLICATIONS

Balle et al., "End-To-End Optimized Image Compression," International Conference on Learning Representations, 27 pages (2017).

(Continued)

*Primary Examiner* — Reza Aghevli
(74) *Attorney, Agent, or Firm* — Finnegan, Henderson, Farabow, Garrett & Dunner, LLP

(57) ABSTRACT

The present disclosure provides method and systems for signaling information regarding chroma quantization parameter (QP) offsets. According to some disclosed embodiments, the methods include: determining whether a joint CbCr residual coding is enabled; and in response to the joint CbCr residual coding being determined to be enabled, signaling a syntax element for adjusting chroma quantization parameter (QP) for joint CbCr component at coding unit (CU) level.

17 Claims, 20 Drawing Sheets

(56) References Cited

U.S. PATENT DOCUMENTS

| | | | |
|---|---|---|---|
| 2015/0016501 A1* | 1/2015 | Guo | H04N 19/94 375/240.02 |
| 2015/0016512 A1 | 1/2015 | Pu et al. | |
| 2015/0189319 A1* | 7/2015 | Pu | H04N 19/46 375/240.03 |
| 2015/0271487 A1* | 9/2015 | Li | H04N 19/58 375/240.02 |
| 2016/0100189 A1* | 4/2016 | Pang | H04N 19/593 375/240.13 |
| 2016/0227225 A1* | 8/2016 | Zou | H04N 19/52 |
| 2016/0227226 A1* | 8/2016 | Rapaka | H04N 19/182 |
| 2016/0227239 A1* | 8/2016 | Pu | H04N 19/176 |
| 2016/0227247 A1* | 8/2016 | Zou | H03M 7/40 |
| 2016/0261864 A1* | 9/2016 | Samuelsson | H04N 19/176 |
| 2016/0261865 A1* | 9/2016 | Li | H04N 19/174 |
| 2016/0373745 A1* | 12/2016 | Joshi | H04N 19/70 |
| 2017/0078683 A1* | 3/2017 | Seregin | H04N 19/463 |
| 2018/0288415 A1* | 10/2018 | Li | H04N 19/13 |
| 2018/0359480 A1* | 12/2018 | Xiu | H04N 19/85 |
| 2019/0104303 A1* | 4/2019 | Xiu | H04N 19/59 |
| 2019/0124330 A1* | 4/2019 | Chien | H04N 19/103 |
| 2019/0158837 A1* | 5/2019 | Zhang | H04N 19/17 |
| 2019/0166370 A1* | 5/2019 | Xiu | H04N 19/147 |
| 2019/0297337 A1* | 9/2019 | Ramasubramonian | H04N 19/124 |
| 2020/0382782 A1* | 12/2020 | Chien | H04N 19/124 |
| 2021/0006792 A1* | 1/2021 | Han | H04N 19/176 |
| 2021/0058622 A1* | 2/2021 | Rusanovskyy | H04N 19/105 |

OTHER PUBLICATIONS

Choi et al., "Variable Rate Deep Image Compression With a Conditional Autoencoder," Proceedings of the IEEE International Conference on Computer Vision, pp. 3146-3154 (2019).

He et al., "Deep Residual Learning for Image Recognition," Proceedings of the IEEE conference on computer vision and pattern recognition, pp. 770-778 (2016).

He et al, "Beyond Coding: Detection-driven Image Compression with Semantically Structured Bit-stream," 2019 Picture Coding Symposium (PCS), pp. 1-5 (2019).

Sandler et al., "MobileNetV2: Inverted Residuals and Linear Bottlenecks," Proceedings of the IEEE conference on computer vision and pattern recognition, pp. 4510-4520 (2018).

Toderici et al., "Variable Rate Image Compression with Recurrent Neural Networks," International Conference on Learning Representations, pp. 1-12 (2016).

Torfason et al., "Towards Image Understanding From Deep Compression Without Decoding," Published as a conference paper at ICLR, p. 1-17 (2018).

PCT International Search Report and Written Opinion dated Oct. 26, 2020, issued in corresponding International Application No. PCT/US2020/045000 (10 pgs.).

\* cited by examiner

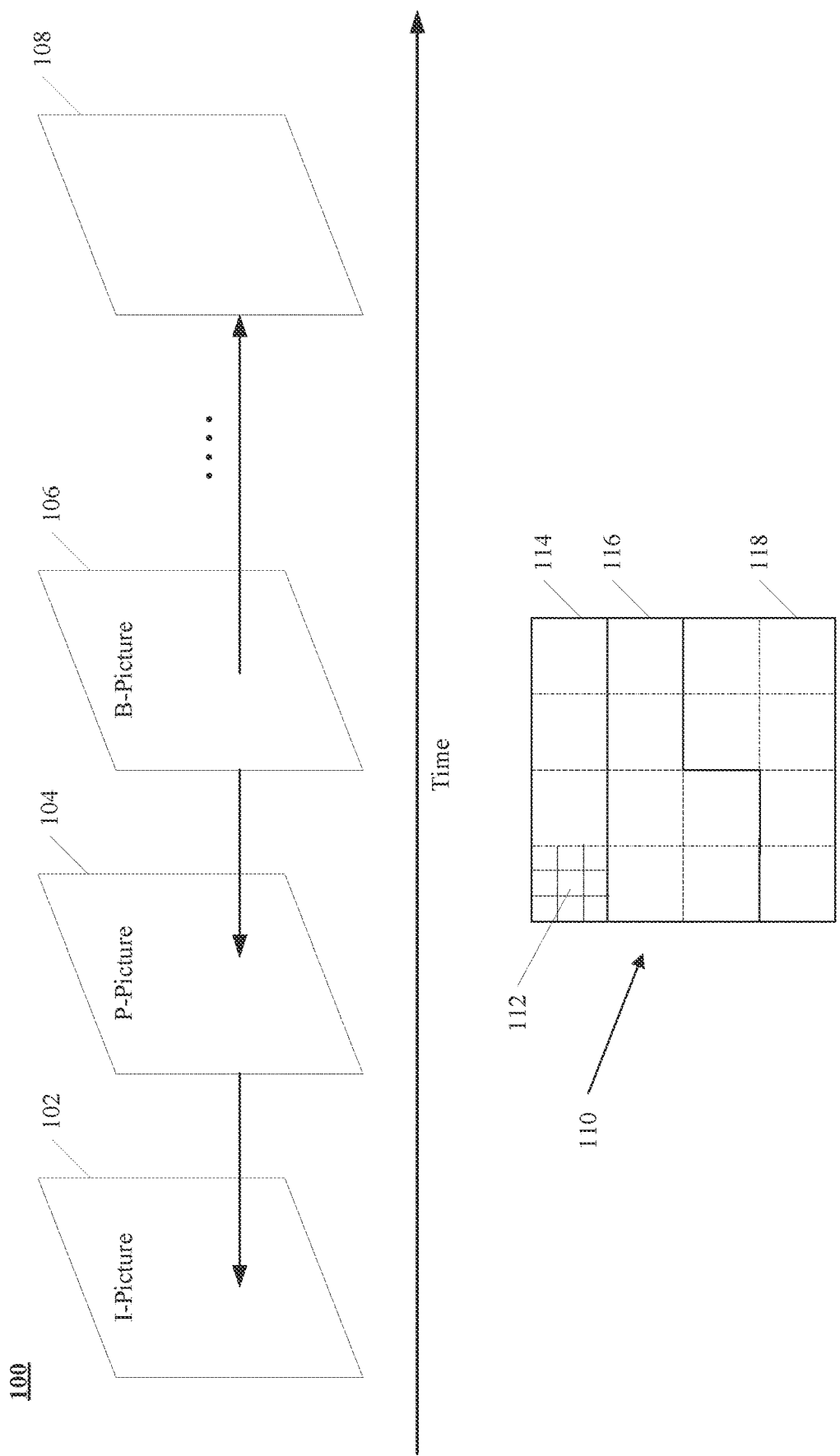

Table 1: Partial syntax structure of PPS regarding CU level chroma QP adjustment

| pic_parameter_set_rbsp( ) { | Descriptor |
|---|---|
|   pps_pic_parameter_set_id | ue(v) |
| ... | |
|   pps_slice_chroma_qp_offsets_present_flag | u(1) |
|   chroma_qp_offset_list_enabled_flag | u(1) |
|   if( chroma_qp_offset_list_enabled_flag ) { | |
|     cu_chroma_qp_offset_subdiv | ue(v) |
|     chroma_qp_offset_list_len_minus1 | ue(v) |
|     for( i = 0; i <= chroma_qp_offset_list_len_minus1; i++ ) { | |
|       cb_qp_offset_list[ i ] | se(v) |
|       cr_qp_offset_list[ i ] | se(v) |
|       joint_cbcr_qp_offset_list[ i ] | se(v) |
|     } | |
|   } | |
|   weighted_pred_flag | u(1) |
| ... | |
| } | |

FIG. 5

Table 2: Partial syntax structure of CTU regarding CU level chroma QP adjustment

| coding_tree_unit( ) { | Descriptor |
|---|---|
|   [...] | |
|   if( slice_type == I && qtbtt_dual_tree_intra_flag ) | |
|     dual_tree_implicit_qt_split ( xCtb, yCtb, CtbSizeY, 0 ) | |
|   else | |
|     coding_tree( xCtb, yCtb, CtbSizeY, CtbSizeY, 1, 1, 0, 0, 0, 0, 0, SINGLE_TREE ) | |
| } | |

FIG. 6

Table 3: Partial syntax structure of dual tree regarding CU level chroma QP adjustment

| dual_tree_implicit_qt_split( x0, y0, cbSize, cqtDepth ) { | Descriptor |
|---|---|
|   cbSubdiv = 2 * cqtDepth | |
|   if( cbSize > 64 ) { | |
|     if( cu_qp_delta_enabled_flag && cbSubdiv <= cu_qp_delta_subdiv ) { | |
|       IsCuQpDeltaCoded = 0 | |
|       CuQpDeltaVal = 0 | |
|       CuQgTopLeftX = x0 | |
|       CuQgTopLeftY = y0 | |
|     } | |
|     *if( cu_chroma_qp_offset_enabled_flag && cbSubdiv <= cu_chroma_qp_offset_subdiv )* | |
|       *IsCuChromaQpOffsetCoded = 0* | |
|     x1 = x0 + ( cbSize / 2 ) | |
|     y1 = y0 + ( cbSize / 2 ) | |
|     dual_tree_implicit_qt_split( x0, y0, cbSize / 2, cqtDepth + 1 ) | |
|     if( x1 < pic_width_in_luma_samples ) | |
|       dual_tree_implicit_qt_split( x1, y0, cbSize / 2, cqtDepth + 1 ) | |
|     if( y1 < pic_height_in_luma_samples ) | |
|       dual_tree_implicit_qt_split( x0, y1, cbSize / 2, cqtDepth + 1 ) | |
|     if( x1 < pic_width_in_luma_samples && y1 < pic_height_in_luma_samples ) | |
|       dual_tree_implicit_qt_split( x1, y1, cbSize / 2, cqtDepth + 1 ) | |
|   } else { | |
|     coding_tree( x0, y0, cbSize, cbSize, 1, 0, cbSubdiv, cqtDepth, 0, 0, 0, DUAL_TREE_LUMA ) | |
|     coding_tree( x0, y0, cbSize, cbSize, 0, *1*, cbSubdiv, cqtDepth, 0, 0, 0, DUAL_TREE_CHROMA ) | |
|   } | |
| } | |

FIG. 7

Table 4: Partial syntax structure of coding tree regarding CU level chroma QP adjustment

| | Descriptor |
|---|---|
| coding_tree( x0, y0, cbWidth, cbHeight, qgOn, cqgOn, cbSubdiv, cqtDepth, mttDepth, depthOffset, partIdx, treeType ) { | |
|   if( ( allowSplitBtVer \|\| allowSplitBtHor \|\| allowSplitTtVer \|\| allowSplitTtHor \|\| allowSplitQT ) && ( x0 + cbWidth <= pic_width_in_luma_samples ) && ( y0 + cbHeight <= pic_height_in_luma_samples ) ) | |
|     split_cu_flag | ae(v) |
|   if( cu_qp_delta_enabled_flag && qgOn && cbSubdiv <= cu_qp_delta_subdiv ) { | |
|     IsCuQpDeltaCoded = 0 | |
|     CuQpDeltaVal = 0 | |
|     CuQgTopLeftX = x0 | |
|     CuQgTopLeftY = y0 | |
|   } | |
|   *if( cu_chroma_qp_offset_enabled_flag && cqgOn && cbSubdiv <= cu_chroma_qp_offset_subdiv )* | |
|     *IsCuChromaQpOffsetCoded = 0* | |
|   if( split_cu_flag ) { | |
|     if( ( allowSplitBtVer \|\| allowSplitBtHor \|\| allowSplitTtVer \|\| allowSplitTtHor ) && allowSplitQT ) | |
|       split_qt_flag | ae(v) |
|     if( !split_qt_flag ) { | |
|       if( ( allowSplitBtHor \|\| allowSplitTtHor ) && ( allowSplitBtVer \|\| allowSplitTtVer ) ) | |
|         mtt_split_cu_vertical_flag | ae(v) |
|       if( ( allowSplitBtVer && allowSplitTtVer && mtt_split_cu_vertical_flag ) \|\| ( allowSplitBtHor && allowSplitTtHor && !mtt_split_cu_vertical_flag ) ) | |
|         mtt_split_cu_binary_flag | ae(v) |
|       if( MttSplitMode[ x0 ][ y0 ][ mttDepth ] == SPLIT_BT_VER ) { | |
|         depthOffset += ( x0 + cbWidth > pic_width_in_luma_samples ) ? 1 : 0 | |
|         x1 = x0 + ( cbWidth / 2 ) | |
|         coding_tree( x0, y0, cbWidth / 2, cbHeight, qgOn, cqgOn, cbSubdiv + 1, cqtDepth, mttDepth + 1, depthOffset, 0, treeType ) | |
|         if( x1 < pic_width_in_luma_samples ) | |
|           coding_tree( x1, y0, cbWidth / 2, cbHeightY, qgOn, cqgOn, cbSubdiv + 1, cqtDepth, mttDepth + 1, depthOffset, 1, treeType ) | |
|       } else if( MttSplitMode[ x0 ][ y0 ][ mttDepth ] == SPLIT_BT_HOR ) { | |
|         depthOffset += ( y0 + cbHeight > pic_height_in_luma_samples ) ? 1 : 0 | |
|         y1 = y0 + ( cbHeight / 2 ) | |
|         coding_tree( x0, y0, cbWidth, cbHeight / 2, qgOn, cqgOn, cbSubdiv + 1, cqtDepth, mttDepth + 1, depthOffset, 0, treeType ) | |
|         if( y1 < pic_height_in_luma_samples ) | |
|           coding_tree( x0, y1, cbWidth, cbHeight / 2, qgOn, cqgOn, cbSubdiv + 1, cqtDepth, mttDepth + 1, depthOffset, 1, treeType ) | |

Part I

FIG. 8

| | |
|---|---|
| `} else if( MttSplitMode[ x0 ][ y0 ][ mttDepth ] == SPLIT_TT_VER ) {` | |
| `x1 = x0 + ( cbWidth / 4 )` | |
| `x2 = x0 + ( 3 * cbWidth / 4 )` | |
| `qgOn = qgOn && ( cbSubdiv + 2 <= cu_qp_delta_subdiv )` | |
| `cqgOn = cqgOn && ( cbSubdiv + 2 <= cu_chroma_qp_offset_subdiv )` | |
| `coding_tree( x0, y0, cbWidth / 4, cbHeight, qgOn, cqgOn, cbSubdiv + 2,`<br>`    cqtDepth, mttDepth + 1, depthOffset, 0, treeType )` | |
| `coding_tree( x1, y0, cbWidth / 2, cbHeight, qgOn, cqgOn, cbSubdiv + 1,`<br>`    cqtDepth, mttDepth + 1, depthOffset, 1, treeType )` | |
| `coding_tree( x2, y0, cbWidth / 4, cbHeight, qgOn, cqgOn, cbSubdiv + 2,`<br>`    cqtDepth, mttDepth + 1, depthOffset, 2, treeType )` | |
| `} else { /* SPLIT_TT_HOR */` | |
| `y1 = y0 + ( cbHeight / 4 )` | |
| `y2 = y0 + ( 3 * cbHeight / 4 )` | |
| `qgOn = qgOn && ( cbSubdiv + 2 <= cu_qp_delta_subdiv )` | |
| `cqgOn = cqgOn && ( cbSubdiv + 2 <= cu_chroma_qp_offset_subdiv )` | |
| `coding_tree( x0, y0, cbWidth, cbHeight / 4, qgOn, cqgOn, cbSubdiv + 2,`<br>`    cqtDepth, mttDepth + 1, depthOffset, 0, treeType )` | |
| `coding_tree( x0, y1, cbWidth, cbHeight / 2, qgOn, cqgOn, cbSubdiv + 1,`<br>`    cqtDepth, mttDepth + 1, depthOffset, 1, treeType )` | |
| `coding_tree( x0, y2, cbWidth, cbHeight / 4, qgOn, cqgOn, cbSubdiv + 2,`<br>`    cqtDepth, mttDepth + 1, depthOffset, 2, treeType )` | |
| `}` | |
| `} else {` | |
| `x1 = x0 + ( cbWidth / 2 )` | |
| `y1 = y0 + ( cbHeight / 2 )` | |
| `coding_tree( x0, y0, cbWidth / 2, cbHeight / 2, qgOn, cqgOn, cbSubdiv + 2,`<br>`    cqtDepth + 1, 0, 0, 0, treeType )` | |
| `if( x1 < pic_width_in_luma_samples )` | |
| `coding_tree( x1, y0, cbWidth / 2, cbHeight / 2, qgOn, cqgOn, cbSubdiv + 2,`<br>`    cqtDepth + 1, 0, 0, 1, treeType )` | |
| `if( y1 < pic_height_in_luma_samples )` | |
| `coding_tree( x0, y1, cbWidth / 2, cbHeight / 2, qgOn, cqgOn, cbSubdiv + 2,`<br>`    cqtDepth + 1, 0, 0, 2, treeType )` | |
| `if( y1 < pic_height_in_luma_samples && x1 < pic_width_in_luma_samples )` | |
| `coding_tree( x1, y1, cbWidth / 2, cbHeight / 2, qgOn, cqgOn, cbSubdiv + 2,`<br>`    cqtDepth + 1, 0, 0, 3, treeType )` | |
| `}` | |
| `} else` | |
| `coding_unit( x0, y0, cbWidth, cbHeight, treeType )` | |
| `}` | |

Part II

FIG. 8 (continued)

Table 5: Partial syntax structure of transform unit regarding CU level chroma QP adjustment

| transform_unit( x0, y0, tbWidth, tbHeight, treeType, subTuIndex ) { | Descriptor |
|---|---|
| ... | |
|   if( ( tu_cbf_luma[ x0 ][ y0 ] \|\| tu_cbf_cb[ x0 ][ y0 ] \|\| tu_cbf_cr[ x0 ][ y0 ] ) &&<br>    treeType != DUAL_TREE_CHROMA ) { | |
|     if( cu_qp_delta_enabled_flag && !IsCuQpDeltaCoded ) { | |
|       cu_qp_delta_abs | ae(v) |
|       if( cu_qp_delta_abs ) | |
|         cu_qp_delta_sign_flag | ae(v) |
|     } | |
|   } | |
|   *if( tu_cbf_cb[ x0 ][ y0 ] \|\| tu_cbf_cr[ x0 ][ y0 ] ) {* | |
|     *if( cu_chroma_qp_offset_enabled_flag && !IsCuChromaQpOffsetCoded ) {* | |
|       *cu_chroma_qp_offset_flag* | *ae(v)* |
|       *if( cu_chroma_qp_offset_flag && chroma_qp_offset_list_len_minus1 > 0 )* | |
|         *cu_chroma_qp_offset_idx* | *ae(v)* |
|     *}* | |
|   *}* | |
| ... | |
| } | |

FIG. 9

Table 6: Exemplary syntax structure of SPS regarding CU level chroma QP offsets

| seq_parameter_set_rbsp( ) { | Descriptor |
|---|---|
| ... | |
|   sps_joint_cbcr_enabled_flag | u(1) |
|   chroma_qp_offset_list_enabled_flag | u(1) |
|   if( chroma_qp_offset_list_enabled_flag ) { | |
|     cu_chroma_qp_offset_subdiv | ue(v) |
|     chroma_qp_offset_list_len_minus1 | ue(v) |
|     for( i = 0; i <= chroma_qp_offset_list_len_minus1; i++ ) { | |
|       cb_qp_offset_list[ i ] | se(v) |
|       cr_qp_offset_list[ i ] | se(v) |
|       if( sps_joint_cbcr_enabled_flag ) | |
|         joint_cbcr_qp_offset_list[ i ] | se(v) |
|     } | |
|   } | |
| ... | |
| } | |

FIG. 10

Table 7: Exemplary syntax structure of slice header regarding CU level chroma QP offsets

| slice_header( ) { | Descriptor |
|---|---|
| ... | |
|   slice_qp_delta | se(v) |
|   if( pps_slice_chroma_qp_offsets_present_flag ) { | |
|     slice_cb_qp_offset | se(v) |
|     slice_cr_qp_offset | se(v) |
|     if( sps_joint_cbcr_enabled_flag ) | |
|       slice_joint_cbcr_qp_offset | se(v) |
|   } | |
|   chroma_qp_offset_list_enabled_flag | u(1) |
|   if( chroma_qp_offset_list_enabled_flag ) { | |
|     cu_chroma_qp_offset_subdiv | ue(v) |
|     chroma_qp_offset_list_len_minus1 | ue(v) |
|     for( i = 0; i <= chroma_qp_offset_list_len_minus1; i++ ) { | |
|       cb_qp_offset_list[ i ] | se(v) |
|       cr_qp_offset_list[ i ] | se(v) |
|       if( sps_joint_cbcr_enabled_flag ) | |
|         joint_cbcr_qp_offset_list[ i ] | se(v) |
|     } | |
|   } | |
| ... | |
| } | |

FIG. 11

Table 8: Exemplary APS parameters type codes and types of APS parameters

| aps_params_type | Name of aps_params_type | Type of APS parameters |
|---|---|---|
| 0 | ALF_APS | ALF parameters |
| 1 | LMCS_APS | LMCS parameters |
| 2 | SCALING_APS | SCALING list data parameters |
| 3 | CQO_APS | CU level chroma QP offsets |
| 4..7 | Reserved | Reserved |

FIG. 12

Table 9: Exemplary APS structure

| adaptation_parameter_set_rbsp( ) { | Descriptor |
|---|---|
|   adaptation_parameter_set_id | u(5) |
|   aps_params_type | u(3) |
|   if( aps_params_type == ALF_APS ) | |
|     alf_data( ) | |
|   else if( aps_params_type == LMCS_APS ) | |
|     lmcs_data( ) | |
|   else if( aps_params_type == SCALING_APS ) | |
|     scaling_list_data( ) | |
|   *else if( aps_params_type == CQO_APS )* | |
|     *cqo_data()* | |
|   aps_extension_flag | u(1) |
|   if( aps_extension_flag ) | |
|     while( more_rbsp_data( ) ) | |
|       aps_extension_data_flag | u(1) |
|   rbsp_trailing_bits( ) | |
| } | |

FIG. 13

Table 10: Exemplary CU level chroma QP offsets data syntax

| cqo_data () { | Descriptor |
|---|---|
| cu_chroma_qp_offset_subdiv | ue(v) |
| chroma_qp_offset_list_len_minus1 | ue(v) |
| for( i = 0; i <= chroma_qp_offset_list_len_minus1; i++ ) { | ue(v) |
| cb_qp_offset_list[ i ] | |
| cr_qp_offset_list[ i ] | u(v) |
| if( sps_joint_cbcr_enabled_flag ) | |
| joint_cbcr_qp_offset_list[ i ] | u(1) |
| } | |
| } | |

FIG. 14

Table 11: Exemplary syntax structure of slice header regarding CU level chroma QP offsets

| slice_header( ) { | Descriptor |
|---|---|
| ... | |
|   slice_qp_delta | se(v) |
|   if( pps_slice_chroma_qp_offsets_present_flag ) { | |
|     slice_cb_qp_offset | se(v) |
|     slice_cr_qp_offset | se(v) |
|     if( sps_joint_cbcr_enabled_flag ) | |
|       slice_joint_cbcr_qp_offset | se(v) |
|   } | |
|   chroma_qp_offset_list_enabled_flag | u(1) |
|   if( chroma_qp_offset_list_enabled_flag ) | |
|     slice_cqo_aps_id | u(3) |
| ... | |
| } | |

FIG. 15

Table 12: Exemplary syntax structure of PPS regarding CU level chroma QP adjustment

| pic_parameter_set_rbsp( ) { | Descriptor |
|---|---|
|   pps_pic_parameter_set_id | ue(v) |
|   ... | |
|   pps_slice_chroma_qp_offsets_present_flag | u(1) |
|   chroma_qp_offset_list_enabled_flag | u(1) |
|   if( chroma_qp_offset_list_enabled_flag ) { | |
|     cu_chroma_qp_offset_subdiv | ue(v) |
|     chroma_qp_offset_list_len_minus1 | ue(v) |
|     joint_cbcr_qp_offset_list_len_minus1 | ue(v) |
|     for( i = 0; i <= chroma_qp_offset_list_len_minus1; i++ ) { | |
|       cb_qp_offset_list[ i ] | se(v) |
|       cr_qp_offset_list[ i ] | se(v) |
|     } | |
|     for( i = 0; i <= joint_cbcr_qp_offset_list_len_minus1; i++ ) | |
|       joint_cbcr_qp_offset_list[ i ] | se(v) |
|   } | |
|   weighted_pred_flag | u(1) |
|   ... | |
| } | |

FIG. 16

METHOD AND SYSTEM FOR SIGNALING CHROMA QUANTIZATION PARAMETER OFFSET

CROSS-REFERENCE TO RELATED APPLICATIONS

The present disclosure claims priority to U.S. provisional application No. 62/903,192, filed on Sep. 20, 2019, which is incorporated herein by reference in its entirety.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

In some embodiments, an exemplary video processing method includes: determining whether a joint CbCr residual coding is enabled; and in response to the joint CbCr residual coding being determined to be enabled, signaling a syntax element for adjusting chroma quantization parameter (QP) for joint CbCr component at coding unit (CU) level.

In some embodiments, an exemplary video processing system includes a memory configured to store instructions and one or more processors coupled to the memory. The one or more processors can be configured to execute the instructions to cause the system to: determine whether a joint CbCr residual coding is enabled; and in response to the joint CbCr residual coding being determined to be enabled, signal a syntax element for adjusting chroma QP for joint CbCr component at CU level.

In some embodiments, an exemplary non-transitory computer-readable storage medium stores a set of instructions. The set of instructions are executable by one or more processors of a device to cause the device to perform: determining whether a joint CbCr residual coding is enabled; and in response to the joint CbCr residual coding being determined to be enabled, signaling a syntax element for adjusting chroma QP for joint CbCr component at CU level.

BRIEF DESCRIPTION OF THE DRAWINGS

Embodiments and various aspects of the present disclosure are illustrated in the following detailed description and the accompanying figures. Various features shown in the figures are not drawn to scale.

FIG. 1 is a schematic diagram illustrating structures of an example video sequence, according to some embodiments of the present disclosure.

FIG. 5 illustrates an exemplary Table 1, according to some embodiments of the present disclosure.

FIG. 6 illustrates an exemplary Table 2, according to some embodiments of the present disclosure.

FIG. 7 illustrates an exemplary Table 3, according to some embodiments of the present disclosure.

FIG. 8 illustrates an exemplary Table 4, according to some embodiments of the present disclosure.

FIG. 9 illustrates an exemplary Table 5, according to some embodiments of the present disclosure.

FIG. 10 illustrates an exemplary Table 6, according to some embodiments of the present disclosure.

FIG. 11 illustrates an exemplary Table 7, according to some embodiments of the present disclosure.

FIG. 12 illustrates an exemplary Table 8, according to some embodiments of the present disclosure.

FIG. 13 illustrates an exemplary Table 9, according to some embodiments of the present disclosure.

FIG. 14 illustrates an exemplary Table 10, according to some embodiments of the present disclosure.

FIG. 15 illustrates an exemplary Table 11, according to some embodiments of the present disclosure.

FIG. 16 illustrates an exemplary Table 12, according to some embodiments of the present disclosure.

DETAILED DESCRIPTION

Figure 2A:
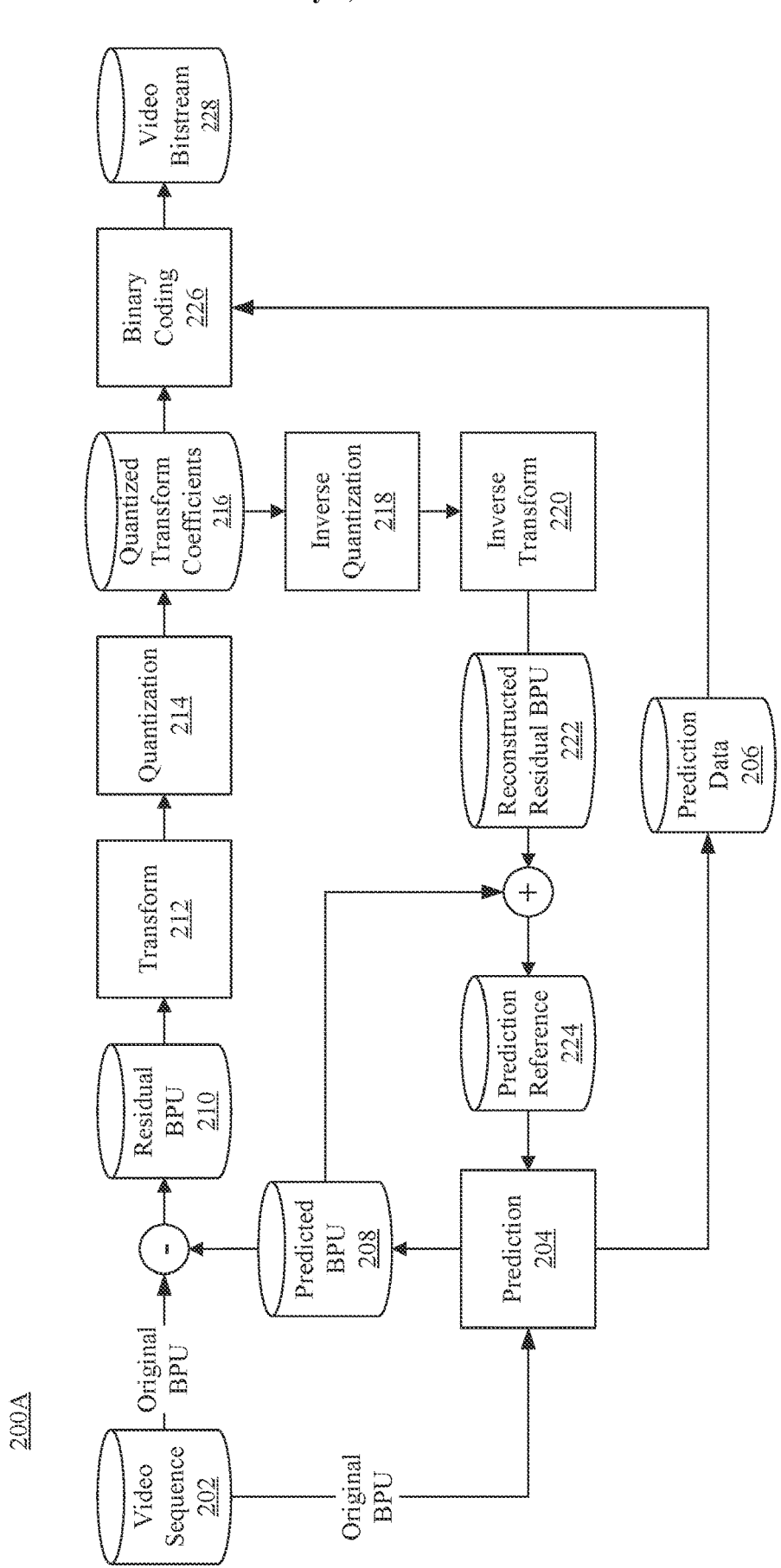
FIG. 2A illustrates a schematic diagram of an exemplary encoding process of a hybrid video coding system, consistent with embodiments of the disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

In order to achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recent, and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture coded using a previous picture as a reference picture is referred to as a "P-picture." A picture coded using both a previous picture and a future picture as reference pictures (i.e., the reference is "bi-directional") is referred to as a "B-picture."

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosures. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CPUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2B:
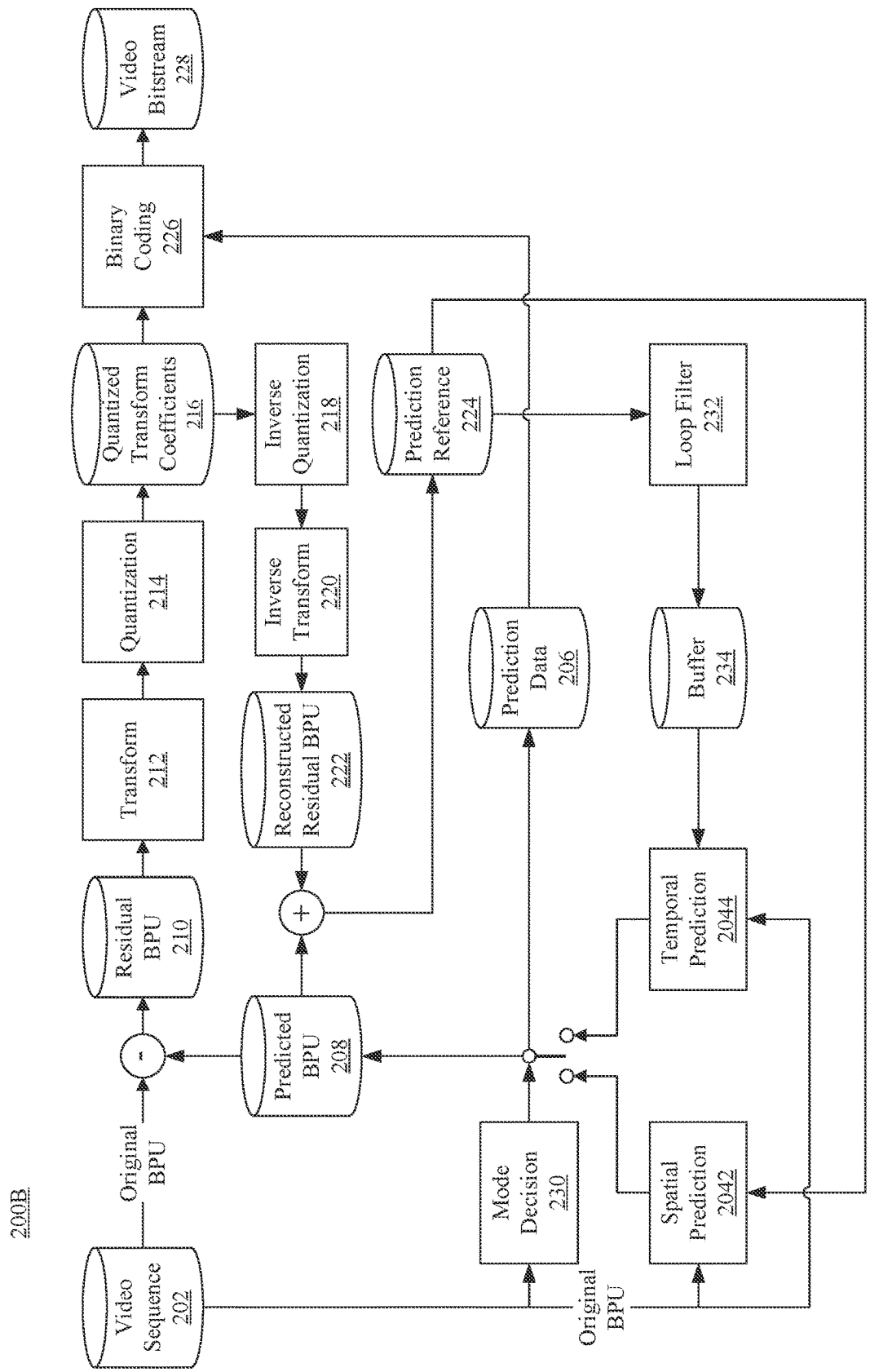
FIG. 2B illustrates a schematic diagram of another exemplary encoding process of a hybrid video coding system, consistent with embodiments of the disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPU that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (i.e., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (i.e., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a hit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
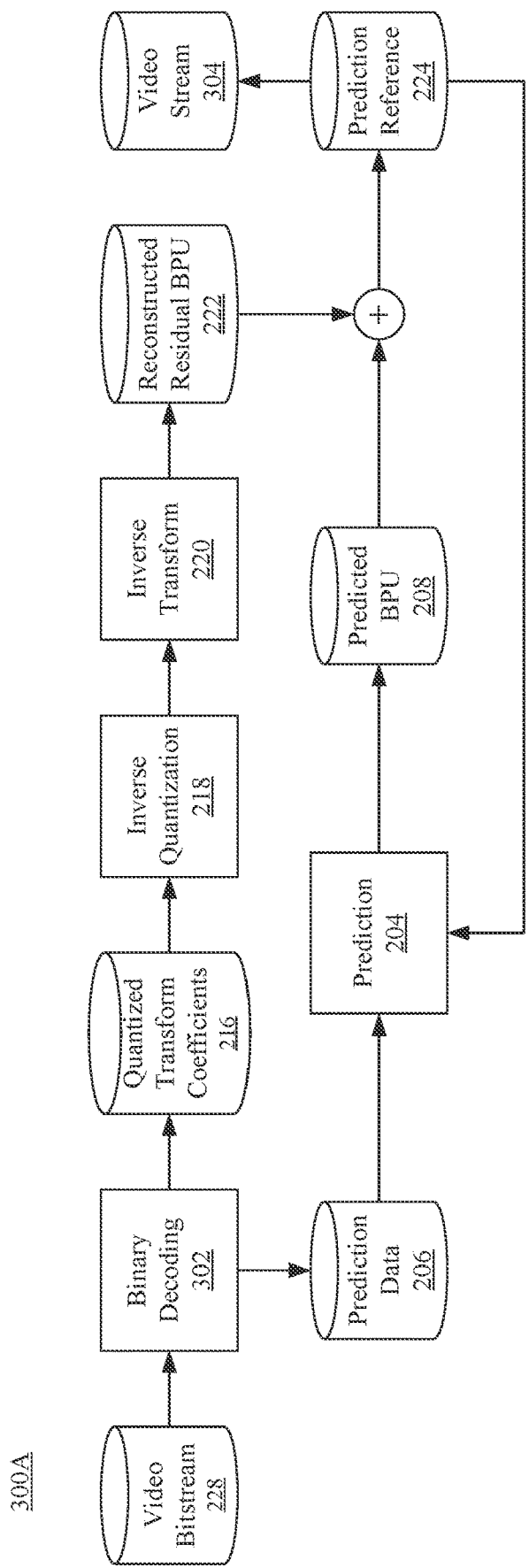
FIG. 3A illustrates a schematic diagram of an exemplary decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transformer stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
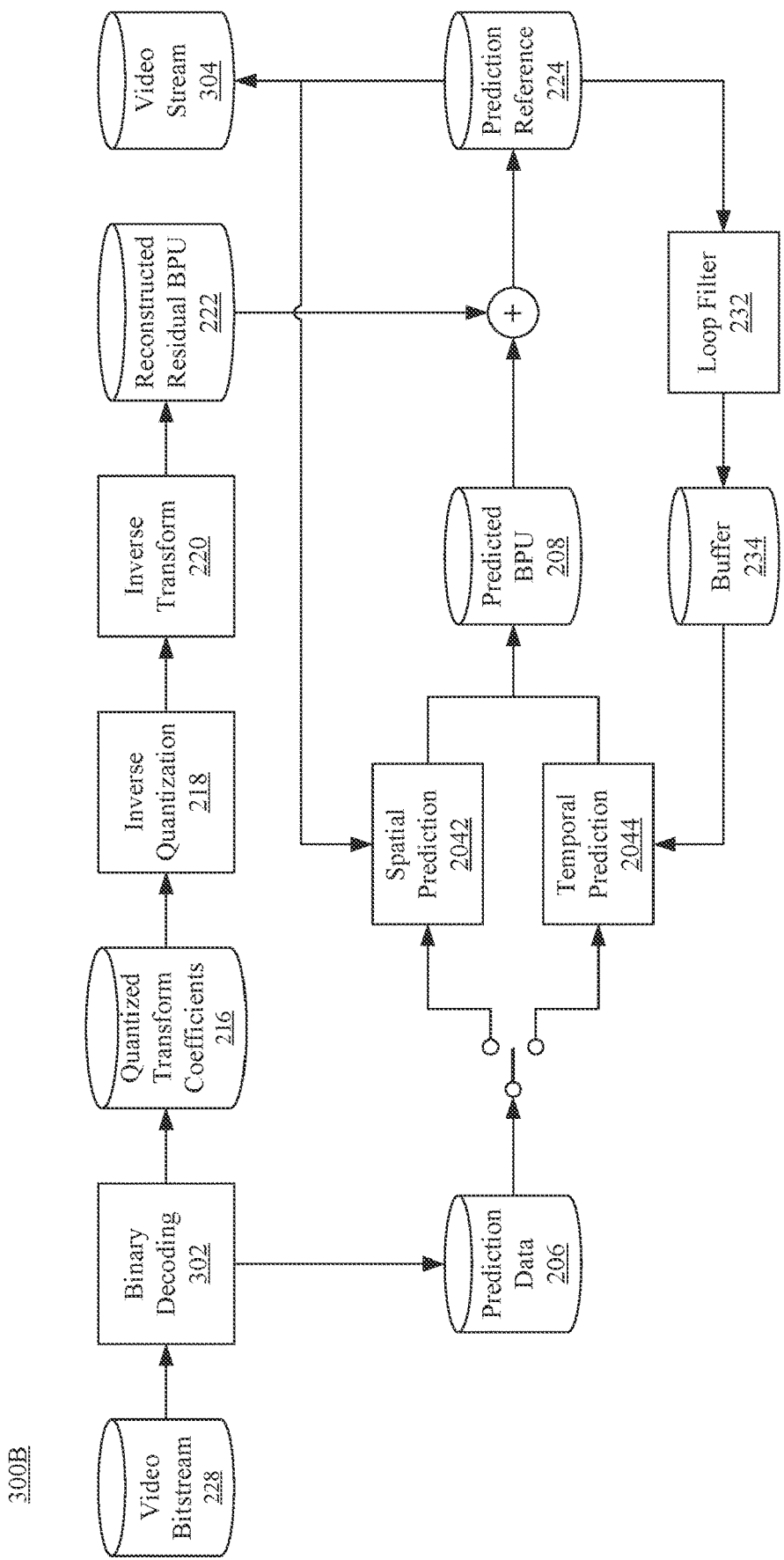
FIG. 3B illustrates a schematic diagram of another exemplary decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
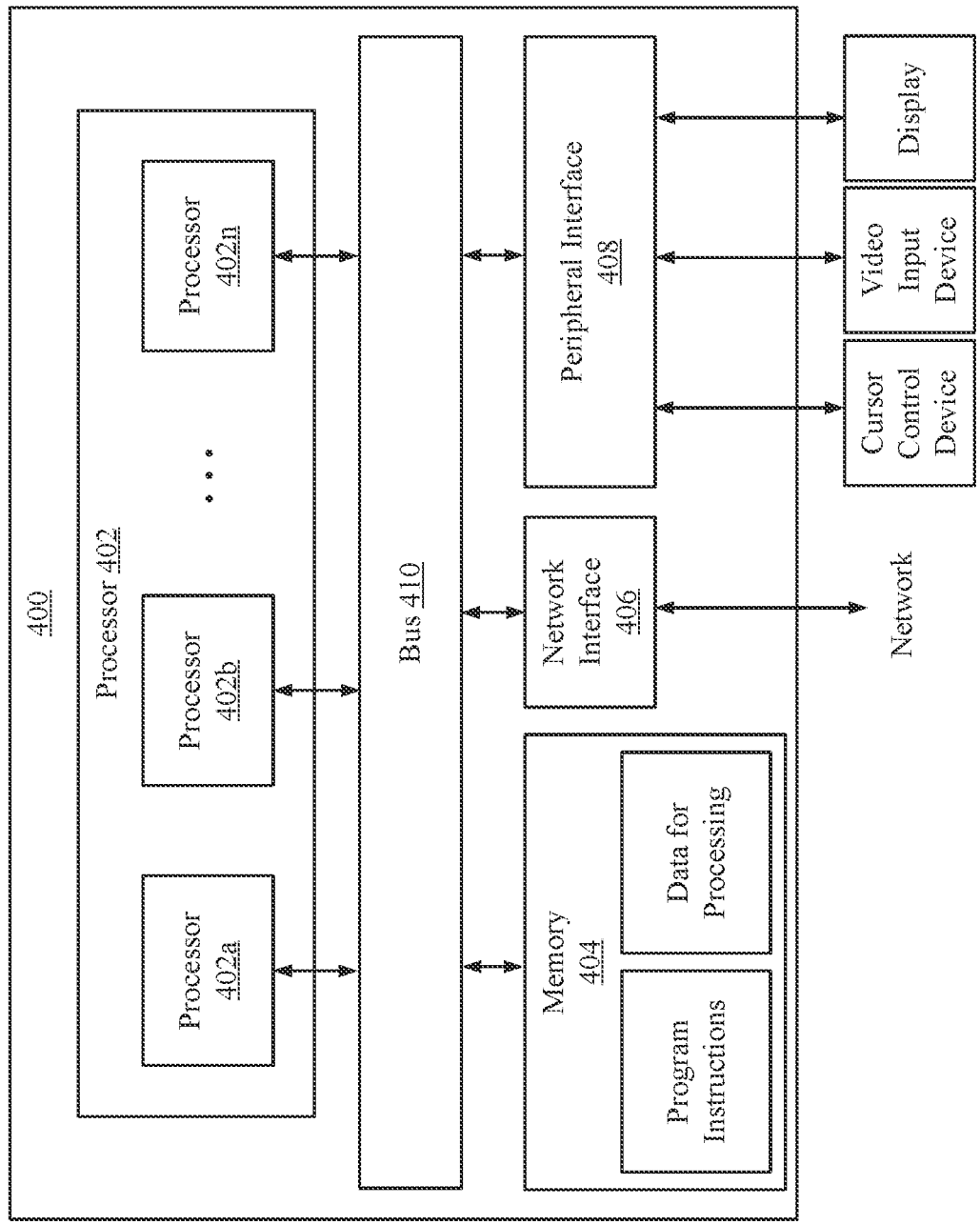
FIG. 4 illustrates a block diagram of an exemplary apparatus for encoding or decoding a video, according to some embodiments of the present disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can implemented as one or more hardware modules of apparatus 400, such as a specialized data processing circuit (e.g., an FPGA, an ASIC, an NPU, or the like).

In the quantization and inverse quantization functional blocks (e.g., quantization 214 and inverse quantization 218 of FIG. 2A or FIG. 2B, inverse quantization 218 of FIG. 3A or FIG. 3B), a quantization parameter (QP) is used to determine the amount of quantization (and inverse quantization) applied to the prediction residuals. Initial QP values used for coding of a picture or slice may be signaled at the high level, for example, using init_qp_minus26 syntax element in the Picture Parameter Set (PPS) and using slice_qp_delta syntax element in the slice header. Further, the QP values may be adapted at the local level for each CU using delta QP values sent at the granularity of quantization groups.

In modern video coding standards, such as AVC, HEVC and VVC, quantization is a process that divide the transform coefficient by quantization step-size and round the resulting value to integer. The quantization step-size is indexed by quantization parameter (QP). The value of QP is signaled in a hierarchal manner. The initial QP values used for coding of a picture or slice may be signaled in high level syntax, for example, using syntax element init_qp_minus26 in the Picture Parameter Set (PPS) and using syntax element slice_qp_delta in the slice header. Further, the QP values may be adjusted at the local level for each CU by using delta QP values sent at the granularity of quantization groups.

The luma component and the chroma components may use different QP values. Besides the chrome components Cb and Cr, VVC draft 6 also supports a coding tool called the joint CbCr residual coding, where the Cb and Cr prediction residuals are coded together only once. Moreover, the chroma components Cb, Cr and joint CbCr can use individual QPs.

The QPs for each chroma component are first derived from the luma QP according to the ChromaQpTables which are signaled in the SPS to represent the mapping between the luma QP and the chroma QPs. As shown in the following Equations (1)-(3), ChromaQpTable[i] (i=0, 1, 2) is used for the Cb, Cr components and joint CbCr coding, respectively:

$$qP_{Cb} = \text{ChromaQpTable}[0][qP_{Luma}] \quad (1)$$

$$qP_{Cr} = \text{ChromaQpTable}[1][qP_{Luma}] \quad (2)$$

$$qP_{CbCr} = \text{ChromaQpTable}[2][qP_{Luma}] \quad (3)$$

Here, $qP_{Luma}$ denotes the input lama QP and $qP_{Cb}$, $qP_{Cr}$, and $qP_{CbCr}$ denote the output chroma QPs corresponding to Cb, Cr and joint CbCr.

High level syntax elements in the PPS and the slice header are signaled to indicate how to adjust the chroma QPs. For example, syntax elements pps_cb_qp_offset and slice_cb_qp_offset are sent for the Cb component, syntax elements pps_cr_qp_offset and slice_cr_qp_offset are sent for the Cr component, and syntax elements pps_cbcr_qp_offset and slice_cbcr_qp_offset are sent for joint CbCr coding. Chroma QP offsets may also be signaled at the local (e.g., CU or quantization group) level. For example, CuQpOffset$_{Cb}$, CuQpOffset$_{Cr}$ and CuQpOffset$_{CbCr}$ can be signaled for the Cb, Cr components and joint CbCr coded blocks respectively to represent the chroma QP adjustment at the CU or TU level, which is described in more detail below. Therefore, the final chroma QPs for Cb, Cr and joint Cbcr (denoted as Qp'$_{Cb}$, Qp'$_{Cr}$ and Qp'$_{CbCr}$) are determined based on the following equations:

$$Qp'_{Cb} = \text{Clip3}(-\text{QpBdOffset}_C, 63, qP_{Cb} + \text{pps\_cb\_qp\_offset} + \text{slice\_cb\_qp\_offset} + \text{CuQpOffset}_{Cb}) \quad (4)$$

$$Qp'_{Cr} = \text{Clip3}(-\text{QpBdOffset}_C, 63, qP_{Cr} + \text{pps\_cr\_qp\_offset} + \text{slice\_cr\_qp\_offset} + \text{CuQpOffset}_{Cr}) \quad (5)$$

$$Qp'_{CbCr} = \text{Clip3}(-\text{QpBdOffset}_C, 63, qP_{CbCr} + \text{pps\_cbcr\_qp\_offset} + \text{slice\_cbcr\_qp\_offset} + \text{CuQpOffset}_{CbCr}) \quad (6)$$

where QpBdOffsetC is the chroma QP range offset.

Tables 1-5 of FIGS. 5-9 (emphases shown in italics) show methods of signaling CU level chroma QP offset, according to some disclosed embodiments.

The following is a description of the semantics of the syntax shown in Tables 1-5 of FIGS. 5-9.

Syntax element chroma_qp_offset_list_enable_flag equal to 1 can specify that the syntax element cu_chroma_qp_offset_flag may be present in the transform unit syntax. Syntax element chroma_qp_offset_list_enabled_flag equal to 0 can specify that the syntax element cu_chroma_qp_offset_flag is not present in the transform unit syntax. When ChromaArrayType is equal to 0, it is a requirement of bitstream conformance that the value of syntax element chroma_qp_offset_list_enabled_flag shall be equal to 0.

Syntax element cu_chroma_qp_offset_subdiv can specify the maximum cbSubdiv value of coding units that convey syntax element cu_chroma_qp_offset_flag. The value range of syntax element cu_chroma_qp_offset_subdiv is specified as follows: if syntax element slice_type is equal to 1, the value of syntax element cu_chroma_qp_offset_subdiv shall be in the range of 0 to 2*(log 2_ctu_size_minus2−log 2_min_qt_size_intra_slice_minus2+MaxMttDepthY), inclusive; otherwise(syntax element slice_type is not equal to 1), the value of syntax element cu_chroma_qp_offset_subdiv shall be in the range of 0 to 2*(log 2_ctu_size_minus2−log 2_min_qt_size_inter_slice_minus2+MaxMttDepthY), inclusive.

Syntax element chroma_qp_offset_list_len_minus1 plus 1 can specify the number of syntax elements cb_qp_offset_list[i], cr_qp_offset_list[i], and joint_cbcr_qp_offset_list[i] that are present in the PPS. The value of syntax element chroma_qp_offset_list_len_minus1 shall be in the range of 0 to 5, inclusive. Syntax elements cb_qp_offset_list[i], cr_qp_offset_list[i], and joint_cbcr_qp_offset_list[i] can specify offsets used in the derivation of Qp'$_{Cb}$, Qp'$_{Cr}$, and Qp'$_{CbCr}$, respectively. The values of syntax elements cb_qp_offset_list[i], cr_qp_offset_list[i], and joint_cbcr_qp_offset_list[i] are in the range of −12 to +12, inclusive.

Syntax element cu_chroma_qp_offset_flag when present and equal to 1, can specify that an entry in the syntax element cb_qp_offset_list[ ] is used to determine the value of CuQpOffset$_{Cb}$, a corresponding entry in the syntax element cr_qp_offset_list[ ] is used to determine the value of CuQpOffset$_{Cr}$, and a corresponding entry in the syntax element joint_cbcr_qp_offset_list[ ] is used to determine the value of CuQpOffset$_{CbCr}$. Syntax element cu_chroma_qp_offset_flag equal to 0 can specify that these lists are not used to determine the values of CuQpOffset$_{Cb}$, CuQpOffset$_{Cr}$, and CuQpOffset$_{CbCr}$.

When syntax element cu_chroma_qp_offset_idx is present, can specify the index into the syntax elements cb_qp_offset_list[ ], cr_qp_offset_list[ ], and joint_cbcr_qp_offset_list[ ] that is used to determine the value of CuQpOffset$_{Cb}$, CuQpOffset$_{Cr}$, and CuQpOffset$_{CbCr}$. When present, the value of syntax element cu_chroma_qp_offset_idx is in the range of 0 to chroma_qp_offset_list_len_minus1, inclusive. When not present, the value of syntax element cu_chroma_qp_offset_idx is inferred to be equal to 0.

When syntax element cu_chroma_qp_offset_flag is present, the following applies:

The variable IsCuChromaQpOffsetCoded is set equal to 1.

The variables CuQpOffset$_{Cb}$, CuQpOffset$_{Cr}$, and CuQpOffset$_{CbCr}$ are derived as follows:

If syntax element cu_chroma_qp_offset_flag is equal to 1, the following applies:

CuQpOffset$_{Cb}$=cb_qp_offset_list[cu_chroma_qp_offset_idx]

CuQpOffset$_{Cr}$=cr_qp_offset_list[cu_chroma_qp_offset_idx]

CuQpOffset$_{CbCr}$=joint_cbcr_qp_offset_list[cu_chroma_qp_offset_idx]

Otherwise (syntax element cu_chroma_qp_offset_flag is equal to 0),

CuQpOffset$_{Cb}$, CuQpOffset$_{Cr}$, and CuQpOffset$_{CbCr}$ are all set equal to 0.

As described above in relation to Tables 1-5 of FIGS. 5-9, when syntax element chroma qp_offsetlist_enabled_flag equals 1, CU level chroma QP offset lists are signaled in PPS by the syntax elements cb_qp_offset_list[i], cr_qp_offset_list[i] and joint_cbcr_qp_offset_list[i] for Cb, Cr components and joint CbCr coding, respectively. However, signaling of syntax element joint_cbcr_qp_offset_list[i] doesn't consider whether the coding tool of joint CbCr is enabled for the current video sequence, which is controlled by the element sps_joint_cbcr_enabled_flag signaled in SPS. Nevertheless, this cannot be solved by straightforwardly adding the condition of syntax element sps_joint_cbcr_enabled_flag before signaling syntax element joint_cbcr_qp_offset_list[i], because that will introduce the parsing dependency between PPS and SPS syntax elements, which is undesirable—because avoiding parsing dependency between PPS and SPS is a design principle that generations of video coding standards (H.264/AVC, H.265/HEVC and H.266/VVC) have upheld. The present disclosure provides signaling methods to address these problems.

The present disclosure provides a method that signals the CU level chroma QP offset in SPS. According to some embodiments, the signal of CU level chroma QP offsets is moved from PPS to SPS. The exemplary syntax structure is shown in the Table 6 of FIG. 10 (emphases shown in italics).

The following is a description of the semantics of the syntax shown in Table 6 of FIG. 10.

Syntax element chroma_qp_offset_list_enabled_flag equal to 1 can specify that the syntax element cu_chroma_qp_offset_flag may be present in the transform unit syntax. Syntax element chroma_qp_offset_list_enabled_flag equal to 0 can specify that the syntax element cu_chroma_qp_offset_flag is not present in the transform unit syntax. When syntax element chroma_qp_offset_list_enabled_flag is not present, it is inferred to be equal to 0.

Syntax element cu_chroma_qp_offset_subdiv can specify the maximum cbSubdiv value of coding units that convey syntax element cu_chroma_qp_offset_flag. The value range of syntax element cu_chroma_qp_offset_subdiv is specified as follows: if syntax element slice_type is equal to 1, the value of syntax element cu_chroma_qp_offset_subdiv shall be in the range of 0 to 2*( log 2_ctu_size_minus2−log 2min_qt_size_intra_slice_minus2+MaxMttDepthY), inclusive; otherwise (syntax element slice_type is not equal to 1), the value of syntax element cu_chroma_qp_offset_subdiv shall be in the range of 0 to 2*(log 2_ctu_size_minus2−log 2_min_qt_size_inter_slice_minus2+MaxMttDepthY), inclusive.

Syntax element chroma_qp_offset_list_len_minus1 plus 1 can specify the number of syntax elements cb_qp_offset_list[i], cr_qp_offset_list[i], and joint_cbcr_qp_offset_list[i] that are present in the PPS. The value of syntax element chroma_qp_offset_list_len_minus1 is in the range of 0 to 5, inclusive. Syntax elements cb_qp_offset_list[i], cr_qp_offset_list[i], and joint_cbcr_qp_offset_list[i] can specify offsets used in the derivation of Qp'$_{Cb}$, Qp'$_{Cr}$, and Qp'$_{CbCr}$, respectively. The values of syntax elements cb_qp_offset_list[i], cr_qp_offset_list[i], and joint_cbcr_qp_offset_list[i] are in the range of −12 to +12, inclusive.

By this way, the CU level chroma QP offsets are signaled in the SPS. Before signaling the syntax element joint_cbcr_qp_offset_list[i] used for the joint CbCr component, the condition of syntax element sps_joint_cbcr_enabled_flag is checked to reduce the unnecessary signaling. With respect to the syntax structure of CTU/CU/TU, the elements regarding the CU level chroma QP adjustment keep identical with the VVC draft 6.

The present disclosure also provides a method that signals the CU level chroma QP offset in slice header. According to some embodiments, the signal of CU level chroma QP offsets is moved from PPS to slice header. The proposed syntax structure is shown in the Table 7 of FIG. 11 (emphases shown in italics).

The following is a description of the semantics of the syntax shown in Table 7 of FIG. 11.

Syntax element chroma_qp_offset_list_enabled_flag equal to 1 can specify that the syntax element cu_chroma_qp_offset_flag may be present in the transform unit syntax. Syntax element chroma_qp_offset_list_enabled_flag equal to 0 can specify that the syntax element cu_chroma_qp_offset_flag is not present in the transform unit syntax. When syntax element chroma_qp_offset_list_enabled_flag is not present, it is inferred to be equal to 0.

Syntax element cu_chroma_qp_offset_subdiv can specify the maximum cbSubdiv value of coding units that convey syntax element cu_chroma_qp_offset_flag. The value range of syntax element cu_chroma_qp_offset_subdiv is specified as follows: if syntax element slice_type is equal to 1, the value of syntax element cu_chroma_qp_offset_subdiv is in the range of 0 to 2*(log 2_ctu_size_minus2−log 2_min_qt_size_intra_slice_minus2+MaxMttDepthY), inclusive; otherwise (syntax element slice_type is not equal to 1), the value of syntax element cu_chroma_qp_offset_subdiv is in the range of 0 to 2*(log 2_ctu_size_minus2−log 2_min_qt_size_inter_slice_minus2+MaxMttDepthY), inclusive.

Syntax element chroma_qp_offset_list_len_minus1 plus 1 can specify the number of syntax elements cb_qp_offset_list[i], cr_qp_offset_list[i], and joint_cbcr_qp_offset_list[i] that are present in the PPS. The value of syntax element chroma_qp_offset_list_len_minus1 is in the range of 0 to 5, inclusive. Syntax elements cb_qp_offset_list[i], cr_qp_offset_list[i], and joint_cbcr_qp_offset_list[i] can specify offsets used in the derivation of Qp'$_{Cb}$, Qp'$_{Cr}$, and Qp'$_{CbCr}$, respectively. The values of syntax elements cb_qp_offset_list[i], cr_qp_offset_list[i], and joint_cbcr_qp_offset_list[i] are in the range of −12 to +12, inclusive.

By this way, the CU level chroma QP offsets are signaled in the slice header. Before signaling the syntax element joint_cbcr_qp_offset_list[i] used for the joint CbCr component, the condition of sps_joint_cbcr_enabled_flag is checked to reduce the unnecessary signaling. With respect to the syntax structure of CTU/CU/TU, the elements regarding the CU level chroma QP adjustment keep identical with the VVC draft 6.

The present disclosure also provides a method that signals the CU level chroma QP offset in adaptation parameter set. According to some embodiments, the signal of CU level chroma QP offsets is signaled in adaptation parameter set (APS). APS is a syntax structure containing syntax elements that apply to zero or more slices. In VVC draft 6, APS includes three types: ALF_APS, LMCS_APS and SCALING_APS, which carry the ALF parameters, luma mapping and chroma scaling (LMCS) parameters and scaling list data parameters, respectively. In this embodiment, a new APS type CQO_APS is proposed to signal the CU level chroma QP offsets, as shown in Table 8 of FIG. 12 (emphases shown in italics).

Tables 9-11 of FIGS. 13-15 show an example of the structure of APS that incorporates the CU level chroma QP offsets data.

The following is a description of the semantics of the syntax shown in Tables 9-11 of FIGS. 13-15.

Syntax element cu_chroma_qp_offset_subdiv can specify the maximum cbSubdiv value of coding units that convey syntax element cu_chroma_qp_offset_flag. The value range of syntax element cu_chroma_qp_offset_subdiv is specified as follows: If syntax element slice_type is equal to 1, the value of syntax element cu_chroma_qp_offset_subdiv is in the range of 0 to 2*(log 2_ctu_size_minus2−log 2_min_qt_size_intra_slice_minus2+MaxMttDepthY), inclusive; otherwise (syntax element slice_type is not equal to 1), the value of syntax element cu_chroma_qp_offset_subdiv is in the range of 0 to 2*(log 2_ctu_size_minus2−log 2_min_qt_size_inter_slice_minus2+MaxMttDepthY), inclusive.

Syntax element chroma_qp_offset_list_len_minus1 plus 1 can specify the number of syntax elements cb_qp_offset_list[i], cr_qp_offset_list[i], and joint_cbcr_qp_offset_list[i] that are present in the PPS. The value of syntax element chroma_qp_offset_list_len_minus1 is in the range of 0 to 5, inclusive. Syntax elements cb_qp_offset_list[i], cr_qp_offset_list[i], and joint_cbcr_qp_offset_list[i] can specify offsets used in the derivation of Qp'$_{Cb}$, Qp'$_{Cr}$, and Qp'$_{CbCr}$, respectively. The values of syntax elements cb_qp_offset_list[i], cr_qp_offset_list[i], and joint_cbcr_qp_offset_list[i] are in the range of −12 to +12, inclusive.

Syntax element chroma_qp_offset_list_enabled_flag equal to 1 can specify that the syntax element cu_chroma_qp_offset_flag may be present in the transform unit syntax. Syntax element chroma_qp_offset_list_enabled_flag equal to 0 can specify that the syntax element cu_chroma_qp_offset_flag is not present in the transform unit syntax. When syntax element chroma_qp_offset_list enabled flag is not present, it is inferred to be equal to 0.

Syntax element slice_cqo_aps_id can specify the syntax element adaptation_parameter_set_id of the CQO_APS that the slice refers to. The TemporalId of the CQO_APS NAL unit having syntax element adaptation_parameter_set_id equal to syntax element slice_cqo_aps_id is less than or equal to the TemporalId of the coded slice NAL unit. If syntax element slice_cqo_aps_id is not present, it is inferred to be 0. The range of syntax element slice_cqo_aps_id can also be specified. For example, it can be in the range of 0 to 7, and hence syntax element slice_cqo_id can be coded by u(3).

In some embodiments, the syntax element cu_chroma_qp_offset_subdiv is kept in the PPS as in VVC draft 6, and only the syntax element chroma_qp_offset_list_len_minus1 and the chroma QP offset lists cb_qp_offset_list[i], cr_qp_offset_list[i], and joint_cbcr_qp_offset_list[i] are moved to the proposed new APS type cqo_data( ).

In the CTU/CU/TU level, the syntax regarding CU level chroma QP adjustment can stay unchanged from VVC draft 6.

By this way, the CU level chroma QP offsets are signaled in the APS, which addresses the issue of dependency between the PPS and SPS regarding syntax element sps_joint_cbcr_enabled_flag. Moreover, the proposed solution can avoid unnecessary redundant transmissions of CU level chroma QP offsets for more slices in the same picture using the identical CU level chroma QP offsets.

The present disclosure also provides a method that signals the syntax element joint_cbcr_qp_offset_list with default value. According to some embodiments, the syntax of CU level chroma QP offsets is not changed. When syntax element sps_joint_cbcr_enabled_flag is false, the syntax element joint_cbcr_qp_offset_list is signaled with the default value. For example, signal all zeros from joint_cbcr_qp_offset_list[0] to joint_cbcr_qp_offset_list[chroma_qp_offset_list_len_minus1].

The semantics of syntax element joint_cbcr_qp_offset_list[i] may be modified as follows: syntax elements cb_qp_offset_list[i], cr_qp_offset_list[i], and joint_cbcr_qp_offset_list[i] can specify offsets used in the derivation of Qp'$_{Cb}$, Qp'$_{Cr}$, and Qp'$_{CbCr}$, respectively. The values of syntax elements cb_qp_offset_list[i], cr_qp_offset_list[i], and joint_cbcr_qp_offset_list[i] are in the range of −12 to +12, inclusive. When the value of syntax element sps_joint_cbcr_enabled_flag is equal to 0, it is a bitstream conformance requirement that all signaled value of syntax element joint_cbcr_qp_offset_list[i] for i in the range of 0 to syntax element chroma_qp_offset_list_len_minus1, inclusive, shall be equal to 0.

Moreover, the present disclosure provides a method for signaling the length of syntax element joint_cbcr_qp_offset_list. Currently in VVC draft 6, the value of syntax element chroma_qp_offset_list_len_minus1 is used to indicate the QP offset list size of syntax elements cb_qp_offset_list[i], cr_qp_offset_list[i], and joint_cbcr_qp_offset_list[i] collectively. According to some embodiments of this disclosure, a second syntax element joint_cbcr_qp_offset_list_len_minus1 may be signaled to indicate the QP offset list size of syntax element joint_cbcr_qp_offset_list[i] separately from the Cb/Cr QP offset lists, as shown in Table 12 of FIG. 16 (emphases in italics). When the value of syntax element sps_joint_cbcr_enabled_flag is equal to 0, it is a bitstream comformance requirement that the value of syntax element joint_cbcr_qp_offset_list_len_minus1 shall be equal to 0, and the signaled value of syntax element joint_cbcr_qp_offset_list[0] shall be equal to 0, too.

Figure 17:
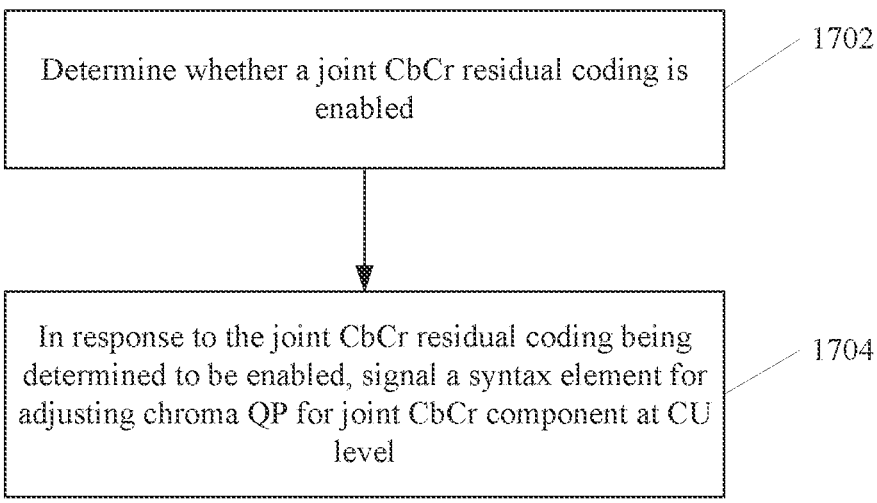
FIG. 17 illustrates a flowchart of an exemplary video processing method, according to some embodiments of the present disclosure.

FIG. 17 illustrates a flowchart of an exemplary video processing method 1700, according to some embodiments of the present disclosure. In some embodiments, method 1700 can be performed by an encoder (e.g., by process 200A of FIG. 2A or 200B of FIG. 2B), a decoder (e.g., by process 300A of FIG. 3A or 300B of FIG. 3B) or performed by one or more software or hardware components of an apparatus (e.g., apparatus 400 of FIG. 4), For example, a processor (e.g., processor 402 of FIG. 4) can perform method 1700. In some embodiments, method 1700 can be implemented by a computer program product, embodied in a computer-readable medium, including computer-executable instructions, such as program code, executed by computers (e.g., apparatus 400 of FIG. 4).

At step 1702, method 1700 can include determining whether a joint CbCr residual coding is enabled. In some embodiments, a flag (e.g., syntax element sps_joint_cbcr_enabled_flag described above) can be used to indicate whether a joint CbCr residual coding is enabled. The flag equal to 1 can specify that a joint CbCr residual coding is enabled.

At step 1704, method 1700 can include in response to the joint CbCr residual coding being determined to be enabled, signaling a syntax element for adjusting chroma QP for joint CbCr component at CU level. In some embodiments, method 1700 can also include signaling syntax elements for adjusting chroma QP for Cb component and Cr component at CU level. The syntax element for adjusting chroma QP for Cb component, Cr component, or joint CbCr component can include a chroma QP offset at CU level. For example, the syntax elements for adjusting chroma QP for Cb component, Cr component, and joint CbCr component can be cb_qp_offset_list[i], and joint_cbcr_qp_offset_list[i], respectively, as described above.

In some embodiments, method 1700 can include signaling, in SPS for a video sequence, the syntax element for adjusting chroma QP for joint CbCr component at CU level. In addition, method 1700 can include signaling, in the SPS, a flag indicating whether the joint CbCr residual coding is enabled. For example, the flag can be syntax element sps_joint_cbcr_enabled_flag as described above. Method 1700 can use the syntax structure shown in Table 6 of FIG. 10.

In some embodiments, method 1700 can include signaling, in a slice header of a target slice of a picture, the syntax element for adjusting chroma QP for joint CbCr component CU level. Method 1700 can use the syntax structure shown in Table 7 of FIG. 11.

In some embodiments, method 1700 can include signaling, in an APS for a target slice of a picture, the syntax element for adjusting chroma QP for joint CbCr component at CU level. Method 1700 can also include signaling, in a slice header of the target slice, an identifier pointing to the APS for the target slice. For example, the identifier can be syntax element slice_cqo_aps_id as shown in Table 11 of FIG. 15. In addition, method 1700 can also include signaling, in the slice header of the target slice, a flag indicating whether a set of syntax elements for adjusting chroma QP at CU level are present. For example, the flag can be syntax element chroma_qp_offset_list_enabled_flag as shown in Table 11 of FIG. 15. Method 1700 can use the syntax structures shown in Tables 8-11 of FIGS. 12-15.

In some embodiments, method 1700 can include in response to the joint CbCr residual coding being determined to be disabled, signaling a default value for adjusting chroma QP for joint CbCr component at CU level.

Figure 18:
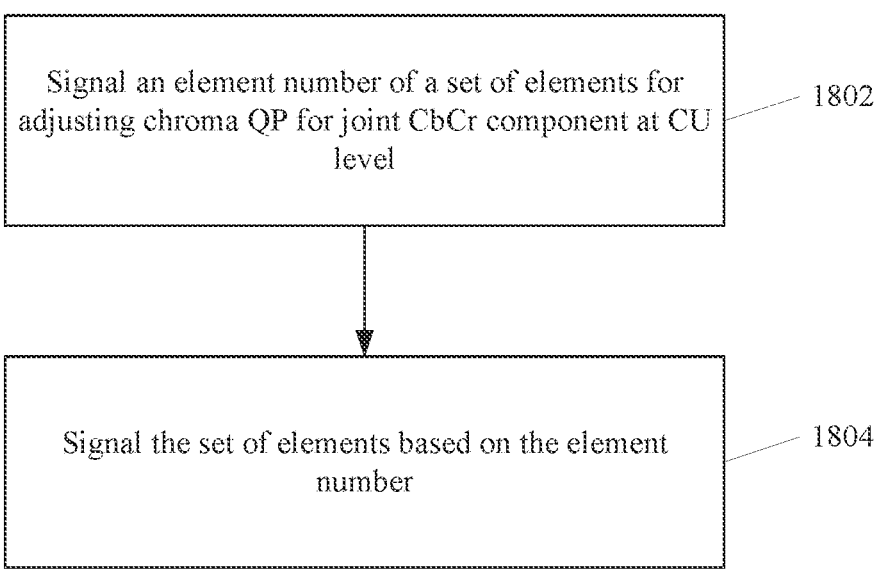
FIG. 18 illustrates a flowchart of another exemplary video processing method, according to some embodiments of the present disclosure.

FIG. 18 illustrates a flowchart of an exemplary video processing method 1800, according to some embodiments of the present disclosure. In some embodiments, method 1800 can be performed by an encoder (e.g., by process 200A of FIG. 2A or 200B of FIG. 2B), a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform method 1800. In some embodiments, method 1800 can be implemented by a computer program product, embodied in a computer-readable medium, including computer-executable instructions, such as program code, executed by computers (e.g., apparatus 400 of FIG. 4).

At step 1802, method 1800 can include signaling an element number of a set of elements for adjusting chroma QP for joint CbCr component at CU level. For example, the element number can be joint_cbcr_qp_offset_list_len_minus1. The set of elements can include a plurality of chroma QP offsets at CU level, e.g., syntax element joint_cbcr_qp_offset_list[i].

At step 1804, method 1800 can include signaling the set of elements based on the element number. For example, method 1800 can use the syntax structures shown in Table 12 of FIG. 16.

In some embodiments, method 1800 can include signaling, in a PPS for a picture, in a SPS for the video sequence, in a slice header of a target slice of a picture, or in an APS for a target slice of a picture, the set of elements based on the element number. For example, method 1800 can use the syntax structures shown in Table 12 of FIG. 16, the syntax structure shown in Table 6 of FIG. 10, the syntax structure shown in Table 7 of FIG. 11, or the syntax structures shown in Tables 8-11 of FIGS. 12-15.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The embodiments may further be described using the following clauses:

1. A video processing method, comprising:
   determining whether a joint CbCr residual coding is enabled; and
   in response to the joint CbCr residual coding being determined to be enabled, signaling a syntax element for adjusting chroma quantization parameter (QP) for joint CbCr component at coding unit (CU) level.

2. The method according to clause 1, further comprising:
   signaling a syntax element for adjusting chroma QP for Cb component at CU level; and
   signaling a syntax element for adjusting chroma QP for Cr component at CU level.

3. The method according to any one of clauses 1 and 2, wherein the syntax element comprises a chroma QP offset at CU level.

4. The method according to any one of clauses 1-3, wherein signaling the syntax element for adjusting chroma QP for joint CbCr component at CU level comprises:
   signaling, in Sequence Parameter Set (SPS) for a video sequence, the syntax element for adjusting chroma QP for joint CbCr component at CU level.

5. The method according to clause 4, further comprising:
signaling, in the SPS, a flag indicating whether the joint CbCr residual coding is enabled.
6. The method according to any one of clauses 1-3, wherein signaling the syntax element for adjusting chroma QP for joint CbCr component at CU level comprises:
signaling, in a slice header of a target slice of a picture, the syntax element for adjusting chroma QP for joint CbCr component at CU level.
7. The method according to any one of clauses 1-3, wherein signaling the syntax element for adjusting chroma QP for joint CbCr component at CU level comprises:
signaling, in an Adaption Parameter Set (APS) for a target slice of a picture, the syntax element for adjusting chroma QP for joint CbCr component at CU level.
8. The method according to clause 7, further comprising:
signaling, in a slice header of the target slice, an identifier pointing to the APS for the target slice.
9. The method according to any one of clauses 7 and 8, further comprising:
signaling, in the slice header of the target slice, a flag indicating whether a set of syntax elements for adjusting chroma QP at CU level are present.
10. The method according to any one of clauses 1-9, further comprising:
in response to the joint CbCr residual coding being determined to be disabled, signaling a default value for adjusting chroma QP for joint CbCr component at CU level.
11. A video processing system, comprising:
a memory configured to store instructions; and
one or more processors coupled to the memory and configured to execute the instructions to cause the system to:
determine whether a joint CbCr residual coding is enabled; and
in response to the joint CbCr residual coding being determined to be enabled, signal a syntax element for adjusting chroma quantization parameter (QP) for joint CbCr component at coding unit (CU) level.
12. The system according to clause 11, wherein the one or more processors are further configured to execute the instructions to cause the system to:
signal a syntax element for adjusting chroma QP for Cb component at CU level; and
signal a syntax element for adjusting chroma QP fur Cr component at CU level.
13. The system according to any one of clauses 11 and 12, wherein the syntax element comprises a chroma QP offset at CU level.
14. The system according to any one of clauses 11-13, wherein the one or more processors are further configured to execute the instructions to cause the system to:
signal, in Sequence Parameter Set (SPS) for a video sequence, the syntax element for adjusting chroma QP for joint CbCr component at CU level.
15. The system according to clause 14, wherein the one or more processors are further configured to execute the instructions to cause the system to:
signal, in the SPS, a flag indicating whether the joint CbCr residual coding is enabled.
16. The system according to any one of clauses 11-13, wherein the one or more processors are further configured to execute the instructions to cause the system to:
signal, in a slice header of a target slice of a picture, the syntax element for adjusting chroma QP for joint CbCr component at CU level.

17. The system according to any one of clauses 11-13, wherein the one or more processors are further configured to execute the instructions to cause the system to:
signal, in an Adaption Parameter Set (APS) for a target slice of a picture, the syntax element for adjusting chroma QP for joint CbCr component at CU level.
18. The system according to clause 17, wherein the one or more processors are further configured to execute the instructions to cause the system to:
signal, in a slice header of the target slice, an identifier pointing to the APS for the target slice.
19. The system according to any one of clauses 17 and 18, wherein the one or more processors are further configured to execute the instructions to cause the system to:
signal, in the slice header of the target slice, a flag indicating whether a set of syntax elements for adjusting chroma QP at CU level are present.
20. The system according to any one of clauses 11-19, wherein the one or more processors are further configured to execute the instructions to cause the system to:
in response to the joint CbCr residual coding being determined to be disabled, signal a default value for adjusting chroma QP for joint CbCr component at CU level.
21. A non-transitory computer-readable storage medium storing a set of instructions that are executable by one or more processors of a device to se the device to perform:
determining whether a joint CbCr residual coding is enabled; and
in response to the joint CbCr residual coding being determined to be enabled, signaling a syntax element for adjusting chroma quantization parameter (QP) for joint CbCr component at coding unit (CU) level.
22. The non-transitory computer-readable storage medium according to clause 21, wherein the set of instructions that are executable by the one or more processors to cause the device to further perform:
signaling a syntax element for adjusting chroma QP for Cb component at CU level; and
signaling a syntax element for adjusting chroma QP for Cr component at CU level.
23. The non-transitory computer-readable storage medium according to any one of clauses 21 and 22, wherein the syntax element comprises a chroma QP offset at CU level.
24. The non-transitory computer-readable storage medium according to any one of clauses 21-23, wherein signaling the syntax element for adjusting chroma QP for joint CbCr component at CU level comprises:
signaling, in Sequence Parameter Set (SPS) for a video sequence, the syntax element for adjusting chroma QP for joint CbCr component at CU level.
25. The non-transitory computer-readable storage medium according to clause 24, wherein the set of instructions that are executable by the one or more processors to cause the device to further perform:
signaling, in the SPS, a flag indicating whether the joint CbCr residual coding is enabled.
26. The non-transitory computer-readable storage medium according to any one of clauses 21-23, wherein signaling the syntax element for adjusting chroma QP for joint CbCr component at CU level comprises:
signaling, in a slice header of a target slice of a picture, the syntax element for adjusting chroma QP for joint CbCr component at CU level.
27. The non-transitory computer-readable storage medium according to any one of clauses 21-23, wherein signaling the syntax element for adjusting chroma QP for joint CbCr component at CU level comprises:
   signaling, in an Adaption Parameter Set (APS) for a target slice of a picture, the syntax element for adjusting chroma QP for joint CbCr component at CU level.

28. The non-transitory computer-readable storage medium according to clause 27, wherein the set of instructions that are executable by the one or more processors to cause the device to further perform:
   signaling, in a slice header of the target slice, an identifier pointing to the APS for the target slice.

29. The non-transitory computer-readable storage medium according to any one of clauses 27 and 28, wherein the set of instructions that are executable by the one or more processors to cause the device to further perform:
   signaling, in the slice header of the target slice, a flag indicating whether a set of syntax elements for adjusting chroma QP at CU level are present.

30. The non-transitory computer-readable storage medium according to any one of clauses 21-29, wherein the set of instructions that are executable by the one or more processors to cause the device to further perform:
   in response to the joint CbCr residual coding being determined to be disabled, signaling a default value for adjusting chroma QP for joint CbCr component at CU level.

31. A video processing method, comprising:
   signaling an element number of a set of elements for adjusting chroma quantization parameter (QP) for joint CbCr component at coding unit (CU) level; and
   signaling the set of elements based on the element number.

32. The method according to clause 31, wherein the set of elements comprises a plurality of chroma QP offsets at CU level.

33. The method according to any one of clauses 31 and 32, wherein signaling the set of elements comprises:
   signaling, in a Picture Parameter Set (PPS) for a picture, in a Sequence Parameter Set (SPS) for the video sequence, in a slice header of a target slice of a picture, or in an Adaption Parameter Set (APS) for a target slice of a picture, the set of elements based on the element number.

34. A video processing system, comprising:
   a memory configured to store instructions; and
   one or more processors coupled to the memory and configured to execute the instructions to cause the system to:
      signal an element number of a set of elements for adjusting chroma quantization parameter (QP) for joint CbCr component at coding unit (CU) level; and
      signal the set of elements based on the element number.

35. The system according to clause 34, wherein the set of elements comprises a plurality of chroma QP offsets at CU level.

36. The system according to any one of clauses 34 and 35, wherein the one or more processors are further configured to execute the instructions to cause the system to:
   signal, in a Picture Parameter Set (PPS) for a picture, in a Sequence Parameter Set (SPS) for the video sequence, in a slice header of a target slice of a picture, or in an Adaption Parameter Set (APS) for a target slice of a picture, the set of elements based on the element number.

37. A non-transitory computer-readable storage medium storing a set of instructions that are executable by one or more processors of a device to cause the device to perform:
   signaling an element number of a set of elements for adjusting chroma quantization parameter (QP) for joint CbCr component at coding unit (CU) level; and
   signaling the set of elements based on the element number.

38. The non-transitory computer-readable storage medium according to clause 37, wherein the set of elements comprises a plurality of chroma QP offsets at CU level.

39. The non-transitory computer-readable storage medium according to any one of clauses 37 and 38, wherein signaling the set of elements comprises:
   signaling, in a Picture Parameter Set (PPS) for a picture, in a Sequence Parameter Set (SPS) for the video sequence, in a slice header of a target slice of a picture, or in an Adaption Parameter Set (APS) for a target slice of a picture, the set of elements based on the element number.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A video processing method, comprising:
   determining whether a joint CbCr residual coding is enabled, wherein the joint CbCr residual coding codes a same prediction residual for both Cb and Cr components of an image block; and
   in response to the joint CbCr residual coding being determined to be enabled, signaling a syntax element for adjusting a quantization parameter (QP) used by the joint CbCr residual coding, the syntax element being signaled in at least one of a Sequence Parameter Set (SPS), a slice header, or an Adaption Parameter Set (APS).

2. The method according to claim 1, further comprising:
   signaling a syntax element for adjusting chroma QP for Cb component at coding unit (CU) level; and
   signaling a syntax element for adjusting chroma QP for Cr component at CU level.

3. The method according to claim 1, wherein the syntax element comprises a chroma QP offset at CU level.

4. The method according to claim 1, wherein the syntax element is signaled in an SPS, and the method further comprises:
   signaling, in the SPS, a flag indicating whether the joint CbCr residual coding is enabled.

5. The method according to claim 1, wherein the syntax element is signaled in an APS for a target slice of a picture, and the method further comprises:
   signaling, in a slice header of the target slice, an identifier pointing to the APS for the target slice.

6. The method according to claim 5, further comprising:
   signaling, in the slice header of the target slice, a flag indicating whether a set of syntax elements for adjusting the QP at CU level are present.

7. The method according to claim 1, further comprising:
   in response to the joint CbCr residual coding being determined to be disabled, signaling a default value for adjusting the QP used by the joint CbCr residual coding.

8. A video processing system, comprising:
   a memory configured to store instructions; and
   one or more processors coupled to the memory and configured to execute the instructions to cause the system to:
   determine whether a joint CbCr residual coding is enabled, wherein the joint CbCr residual coding codes a same prediction residual for both Cb and Cr components of an image block; and
   in response to the joint CbCr residual coding being determined to be enabled, signal a syntax element for adjusting chroma quantization parameter (QP) used by the joint CbCr residual coding, the syntax element being signaled in at least one of a Sequence Parameter Set (SPS), a slice header, or an Adaption Parameter Set (APS).

9. The system according to claim 8, wherein the syntax element is signaled in an SPS, and the one or more processors are further configured to execute the instructions to cause the system to:
   signal, in the SPS, a flag indicating whether the joint CbCr residual coding is enabled.

10. The system according to claim 8, wherein the syntax element is signaled in an APS for a target slice of a picture, and the one or more processors are further configured to execute the instructions to cause the system to:
    signal, in a slice header of the target slice, an identifier pointing to the APS for the target slice.

11. The system according to claim 8, wherein the one or more processors are further configured to execute the instructions to cause the system to:
    in response to the joint CbCr residual coding being determined to be disabled, signal a default value for adjusting the QP used by the joint CbCr residual coding.

12. A non-transitory computer-readable storage medium storing a set of instructions that are executable by one or more processors of a device to cause the device to perform:
    determining whether a joint CbCr residual coding is enabled, wherein the joint CbCr residual coding codes a same prediction residual for both Cb and Cr components of an image block; and
    in response to the joint CbCr residual coding being determined to be enabled, signaling a syntax element for adjusting chroma quantization parameter (QP) used by the joint CbCr residual coding, the syntax element being signaled in at least one of a Sequence Parameter Set (SPS), a slice header, or an Adaption Parameter Set (APS).

13. The non-transitory computer-readable storage medium according to claim 12, wherein the syntax element is signaled in an SPS, and the set of instructions that are executable by the one or more processors to cause the device to further perform:
    signaling, in the SPS, a flag indicating whether the joint CbCr residual coding is enabled.

14. The non-transitory computer-readable storage medium according to claim 12, wherein the syntax element is signaled in an APS for a target slice of a picture, and the set of instructions that are executable by the one or more processors to cause the device to further perform:
    signaling, in a slice header of the target slice, an identifier pointing to the APS for the target slice.

15. The non-transitory computer-readable storage medium according to claim 12, wherein the set of instructions that are executable by the one or more processors to cause the device to further perform:
    in response to the joint CbCr residual coding being determined to be disabled, signaling a default value for adjusting chroma QP for joint CbCr component at CU level.

16. The system according to claim 10, wherein the one or more processors are further configured to execute the instructions to cause the system to:
    signal, in the slice header of the target slice, a flag indicating whether a set of syntax elements for adjusting chroma QP at CU level are present.

17. The non-transitory computer-readable storage medium according to claim 14, wherein the set of instructions that are executable by the one or more processors to cause the device to further perform:
    signaling, in the slice header of the target slice, a flag indicating whether a set of syntax elements for adjusting chroma QP at CU level are present.

* * * * *